United States Patent [19]

Schweiger et al.

[11] 4,092,217
[45] May 30, 1978

[54] FUEL ELEMENTS FOR NUCLEAR REACTORS AND METHOD FOR TESTING THE CIRCULATION OF FUEL ELEMENTS IN A CORE OF A NUCLEAR REACTOR

[75] Inventors: Fritz Schweiger, Hagen, Germany; Wilfried Fritzsche, Graz, Austria

[73] Assignee: Hochtemperatur-Kernkraftwerk GmbH (HKG) Gemeinsames Europaisches Unternehman, Uentrop, Unna, Germany

[21] Appl. No.: 455,532

[22] Filed: Mar. 28, 1974

[30] Foreign Application Priority Data

Mar. 30, 1973 Germany .............................. 2315847

[51] Int. Cl.² .............................................. G21C 3/00
[52] U.S. Cl. ............................. 176/58 PB; 176/19 R; 176/68; 176/82; 176/91 SP
[58] Field of Search ............ 176/71, 67, 91 R, 91 SP, 176/82, 87, 19 R, 58 RB

[56] References Cited

U.S. PATENT DOCUMENTS

| 2,967,811 | 1/1961 | Flint | 204/193.2 |
|---|---|---|---|
| 3,079,316 | 2/1963 | Johnson | 204/154.2 |
| 3,089,785 | 5/1963 | Lewis et al. | 117/71 |
| 3,166,614 | 1/1965 | Taylor | 264/21 |
| 3,278,389 | 10/1966 | Delpeyroux | 176/81 |
| 3,288,636 | 11/1966 | Staubwasser | 117/130 |
| 3,293,135 | 12/1966 | Jay et al. | 176/17 |
| 3,304,235 | 2/1967 | Granata et al. | 176/82 |
| 3,309,283 | 3/1967 | Alfille | 176/72 |
| 3,312,597 | 4/1967 | Glueckauf | 176/67 |
| 3,322,645 | 5/1967 | Barker et al. | 176/75 |
| 3,325,373 | 6/1967 | Schlicht et al. | 176/39 |
| 3,350,272 | 10/1967 | Seltorp | 176/32 |
| 3,350,274 | 10/1967 | Higatsberger | 176/69 |
| 3,472,734 | 10/1969 | Boettcher | 176/71 |
| 3,700,482 | 10/1972 | Jacky | 117/50 |

FOREIGN PATENT DOCUMENTS

| 2,102,727 | 3/1972 | Germany | 176/19 R |
|---|---|---|---|
| 7,009,955 | 1/1971 | Netherlands | 176/19 R |
| 1,084,999 | 9/1967 | United Kingdom | 176/67 |
| 933,500 | 8/1963 | United Kingdom | 176/91.5 SP X |

Primary Examiner—Samuel W. Engle
Assistant Examiner—Ralph Palo
Attorney, Agent, or Firm—Toren, McGeady and Stanger

[57] ABSTRACT

A method of testing the circulation of a bulk charge of fuel elements in the core of a pebble bed type of nuclear reactor comprises increasing the electrical conductivity of a number of fuel elements and then injecting the marked elements into a bulk charge of other unmarked elements having a lower electrical conductivity at predetermined positions in the core of a nuclear reactor and a measured times. The marked fuel elements are subsequently detected electromagnetically as they are carried in the bulk charge of unmarked elements through an electromagnetic field generated by a detection and measurement station. The elements are marked by including a material having a greater electrical conductivity than the remainder of the element and this material may be coated on the surface of the elements or incorporated in the body of the elements.

17 Claims, 6 Drawing Figures

FUEL ELEMENTS FOR NUCLEAR REACTORS AND METHOD FOR TESTING THE CIRCULATION OF FUEL ELEMENTS IN A CORE OF A NUCLEAR REACTOR

The invention relates to a process for detecting the passage of marked fuel elements, which have been marked for test or measurement purposes, distributed in a bulk charge of unmarked fuel elements circulating in a reactor and forming its core, and to the construction of test or measurement spheres for use in the process.

In the operation of a reactor of the pebble bed type, whose core consists of a bulk charge of spherical fuel elements which circulate in the reactor during the reaction, in order to optimize the course of the reaction, it is necessary to understand exactly how the charge is flowing so that one can control the reflux of the elements and, if necessary, add fresh charge, without interfering with the reaction. Although the present invention can be applied wherever circulating bulk charges are used, it will be described with respect to a nuclear reactor containing a charge of circulating spheres.

In gas-cooled high-temperature reactors the core usually consists of a bulk charge of spherical fuel elements each of which has an outer jacket made of graphite. The spherical shape of the fuel elements makes it possible to add fresh fuel elements during the operation of the reactor and to remove used-up fuel elements. The fuel elements are fed to the reactor by a feeding arrangement which consists essentially of a system of tubes through which the fuel elements are conveyed, either by gravity or pneumatically with the help of the cooling gas. The system of tubes is arranged so that the fuel elements can be charged to the reactor, removed from the reactor, and circulated around the reactor in a definite way, in regard to both location and timing. It is therefore possible, assuming that fresh fuel elements are all enriched to the same degree, to influence the radial distribution of the energy flux in the core during the operation of the reactor. In particular it is preferable to concentrate the fresh and consequently less used-up fuel elements in the outer zones of the core, keeping the more used-up fuel elements, containing less active uranium, nearer the middle of the core.

This desired distribution of energy flux in the core is called "flux flattening". In order to utilize this effect to the best advantage it is necessary to know the flow rate of the fuel elements in the outer zones of the core, in relation to the flow rate near the vertical axis of the core. Although flow paths and flow rates can be determined with the help of small-scale models and then these results converted by calculation to represent what should happen under real conditions, in practice considerable errors are involved using this technique.

Even when tests are made on full sized models they do not reliably indicate what happens in actual practice, because certain effects which occur during the practical operation of the reactor cannot be reproduced on the model. For example, in the operation of a power reactor it has been found tht the coefficient of friction between the fuel elements when they are in a dry helium atmosphere depends upon the temperature. When a fuel element travels through the core of an operating reactor, it passes through zones of different temperature and consequently its coefficient of friction varies from one instant to the next. At a skin temperature of 1000° C the coefficient of friction is about 0.3, whereas at 300° C it can be as high as 0.8.

It is required therefore to compare the flow rates measured in a model with those really occurring in practice, in order to correct the charging programme that was established with the help of the model.

To measure the flow rates of the elements in real operation it is necessary to mark a small number of elements, that is to say a small fraction of the total charge, and use them as test or measuring elements. The marking must be done in such a way that the marked elements can be detected when they are leaving the reaction vessel. On the other hand there must be no difference between the marked and the unmarked elements with regard to their coefficients of friction. Furthermore the marked and the unmarked elements must behave in the same way, for example with regard to neutron flux.

In connection with measurements made on core temperatures, in a reactor charged with circulating spherical fuel elements, it has been proposed to give each test element a flat at one location, so that it is captured, on leaving the core, by a device with which these reactors are equipped, which tests each fuel element for its geometrical shape and ejects damaged elements into a receptacle for rejects.

But this proposal has several disadvantages. In the first place the abnormal geometric shape of the test elements could under some circumstances cause them to flow in a non-representative way through the reactor core. Another disadvantage is that for the detection of each test element, it is necessary to dismantle the receptacle for rejects, which is a cumbersome operation, and find the test element among the damaged fuel elements. This may seriously upset the course of the reaction.

The aim of the present invention is to provide a process of the kind mentioned which removes the disadvantages mentioned above. In particular the aim is to make it possible to detect the test or measurement elements without interfering with the system of tubes and without any time delay.

According to our invention in a method of testing the passage of fuel elements in a circulating bulk charge of fuel elements which forms the core of a nuclear reactor of the pebble bed type, in which a number of test fuel elements which have been marked by preparation so that they have a higher electrical conductivity than the other fuel elements, are fed into the bulk charge of other elements at predetermined locations and at measured times, and are subsequently detected electromagnetically as they are carried in the charge through an electromagnetic field generated by a measurement and counting station.

This method has several important advantages. In the first place the flow of fuel elements through the reactor is not disturbed by geometrically different test or measurement elements. Secondly, the detection pulse produced in the measurement or counting station, which must be distinctly greater than the pulse produced when an unmarked element is being detected, is a clear and unmistakable signal which can if necessary be processed further without difficulty. It is particularly beneficial if the measurement or counting station is a counting station of the kind described in German Patent Specification No. 2,102,727.

To obtain clear information on the flow properties of bulk charges several marked elements are preferably fed simultaneously and repeatedly to particular selected locations on the surface of the charge. The time of arrival of each marked element at the measurement station is determined. From this, conclusions can be drawn regarding the path through the reactor followed by the marked element. Particularly clear information can be derived by using a 2-zone method. By this method the test or measurement elements are fed in, on the one hand centrally and, on the other hand, near the periphery of the charge. Once the test or measurement elements have passed the detection station, they are removed from the system and kept ready for further tests, so as not to falsify subsequent results.

The test or measurement elements must, of course, be made sufficiently electrically conductive to allow detection by the process according to the invention. It should however be observed that usually in reactors containing circulating fuel elements all the elements are electrically conductive to a certain extent. In this case what is necessary is to increase the conductivity in the test or measurement elements sufficiently to ensure that they are reliably detected. In accordance with a further feature of our invention a fuel element for use as a test element has internal or external marking which increases its electrical conductivity.

The preferred materials for the internal or external markings are silicon, tungsten, tantalum, zirconium, titanium, their carbides, or iridium, osmium or rhenium. The preferred methods for producing the markings are by chemical deposition from the vapour phase, currentless chemical deposition and electrolytic deposition.

The fuel elements used in reactors of this kind show a certain electrical conductivity due to their compositions, particularly due to the use of graphite. The dose of neutrons absorbed by graphite in reactors can increase its specific resistance by a factor of 7. It is therefore necessary to give the test or measurement elements conductivities considerably above the greatest conductivities that will be shown by fresh fuel elements. The electrical conductivity of the test or measurement element should therefore be at least twice as high as that of an ordinary element. ON the other hand if the fuel elements forming the reactor charge are entirely nonconductive, then any treatment which gives the test or measurement elements a certain conductivity distinguishes them from the other elements in the sense of the present invention.

The conductivity of the test elements can be increased, in the first place, by changing the conductivity of the entire element, that is to say, in the case of the fuel elements mentioned above, of the entire graphite mass. This can however result in disadvantages in that it can change the radioactive properties of the fuel elements. Therefore it is advisable to exploit one of the other aspects of the present invention and in particular, mark the surface of the element, or if it is essential to leave the surface characteristics unchanged, mark the interior of the element, with a substance of high electrical conductivity. The marks, whether internal or external, can take the form of either continuous or interrupted layers. If an internal marking is preferred, the first step is to make an inner element. The surface of this is then given pressed depressions, or ground depressions, which form a network. The depressions are then filled with a material of good conductivity, and then the inner element is given an outer coating, for example by a further pressing operation.

According to a further aspect of this invention, a particularly effective internal or external marking can be made in the form of at least three metal loops in planes perpendicular to each other which are bonded conductively to each other at their crossing points.

The preferred operating frequency for the measurement or counting station is chosen in dependence on the surface resistance of the majority of the elements. Using spherical elements of approximately 60 mm diameter and having a surface resistance of 1.5 mOhm, measurements made at frequencies between 3 and 10 kHz have given the best results. If the frequency is too high the high conductivity of fresh fuel elements can have a disturbing effect. On the other hand, too low a frequency excessively weakens the overall response of the detector. In choosing the best frequency to use in detecting the test or measurement elements in the charge of a reactor of this kind, a characteristic to be fulfilled is that the electrical conductivity of the marked elements after they have been subjected to high neutron doses must still be high enough to produce a sufficient measured effect to distinguish them from fresh unmarked fuel elements which have not yet been subjected to any neutron flux.

The process according to the invention can be applied with great advantage, when both the marked elements are detected and the other elements are also counted. In this case two operating frequencies are used for the detection station, to ensure that the marked elements are detected. This is because a measurement system suitable for counting unmarked elements must not differentiate between unmarked elements which have had different sojourn periods in the reactor and consequently different resistances. Under these circumstances the marked elements are preferably detected at lower frequencies. However, using a single measurement system in which the elements pass axially through a cylindrical coil, an unmistakable signal can be derived, whenever a marked element passes through the coil, from the difference or ratio between measurements made at two different frequencies.

Thus this invention makes it possible to determine, easily and conveniently, the flow behavior of spherical reactor elements of all kinds in which the elements circulate during the operation of the reactor, and so allow the course of the reaction to be controlled in the required manner.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

Figure 1:
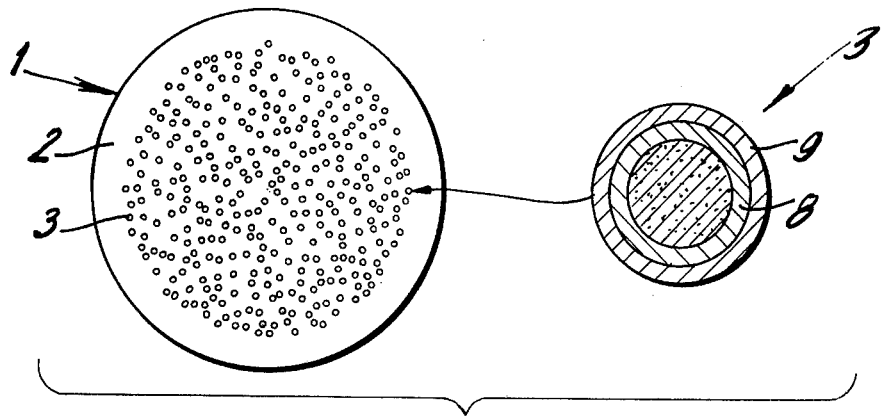
FIG. 1 shows a cross section of a conventional prior art fuel element of spherical or pebble form for use in a high temperature nuclear reactor.

Turning first to the prior art fuel element of FIG. 1, the fuel element comprises a compressed graphite matrix 1 in which are imbedded the coated fuel particles 3. In practice, about 30,000 to 35,000 coated particles are contained in an element. The construction of such coated fuel particles is well known in the art and is indicated in cross section on the right-hand side of FIG. 1, which shows an enlargement of one of the coated fuel particles 3, which has two coatings 8 and 9.

Figure 2:
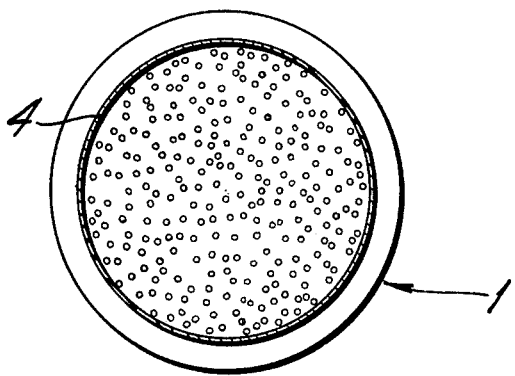
FIG. 2 shows a first embodiment of a conventional fuel element modified in accordance with the invention.
Figure 4:
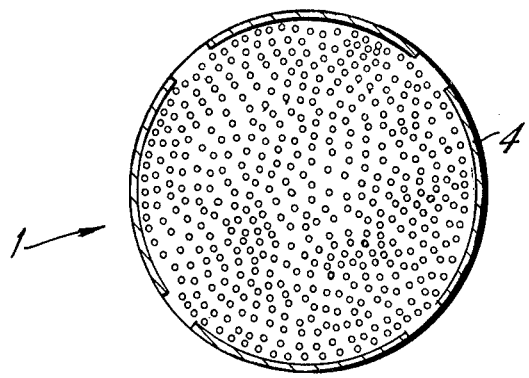
FIG. 4 is another embodiment of the invention.
Figure 5:
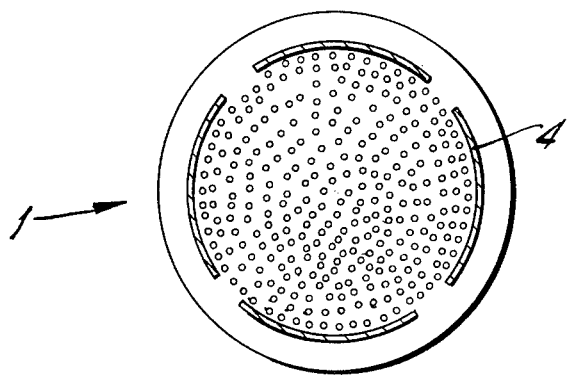
FIG. 5 is still another embodiment of the invention.

The rim or spherical dish portion 2 of the element is free of coated particles and consists exclusively of graphite. Portion 2 has usually thickness of about 5 mm. The dish-portion 2 is applied by subsequent compacting of the coated particles — graphite matrix. Pursuant to the invention, and referring to FIG. 2, which is a cross-sectional view, the graphite matrix 1 prior to the customary subsequent recompacting with pure graphite (see the marginal spherical dish zone 2 of FIG. 1) is provided with an electrically-conductive metal layer indicated by reference numeral 4. The layer 4 may be continuous as shown in FIG. 2 or discontinuous as shown in FIGS. 4 and 5. In FIG. 4 the discontinuous layer is applied to the surface of the element, while in FIG. 5 it is applied to the surface of the matrix of the coated fuel particles 3 inwardly of the rim portion 2 which is free of coated particles. The layer 4 has a greater conductivity than the fuel particles proper and the graphite moderator material so that the element is capable of being identified electromagnetically. It can thus be distinguished from other fuel elements which do not include the layer or marking 4. It will be noted that the fuel elements are not imparted with any change of their geometric form by the inclusion of the layer 4 which, although shown situated beneath the surface of the element, could also be provided on the surface of the element.

Figure 3:
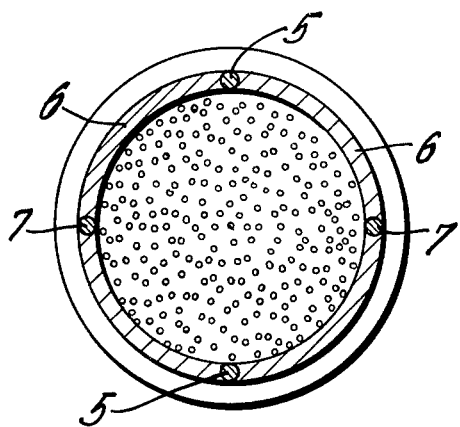
FIG. 3 is an embodiment of a fuel element modified in accordance with a second embodiment of the invention.

Pursuant to the embodiment of FIG. 3, three metal loops 5, 6 and 7 are incorporated in the fuel element. These metal loops, sometimes referred to as short-circuit windings, are situated in mutually perpendicular planes, the loops being electrically bonded to each other at their crossing points. The loop 6 is situated in the plane of the drawing. The material from which the marking layers or loops are made may be silicon, tungsten, tantalum, zirconium, titanium, iridium, osmium or rhenium or the like highly conductive substances.

Figure 6:
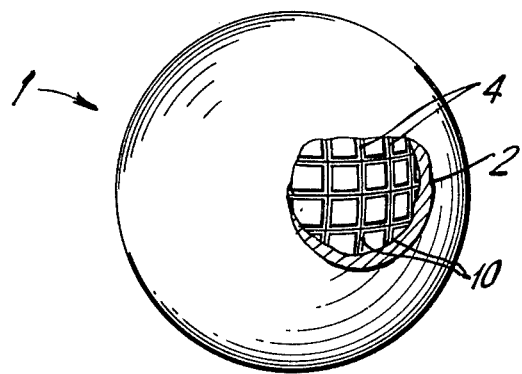
FIG. 6 is a perspective view of a fuel element embodying the present invention with a portion of the outer layer of the fuel element broken away.

In FIG. 6 a part of the rim portion 2, free of coated particles, is broken away revealing the surface of the matrix containing the coated fuel particles and moderator material. Grooves 10 are defined in the surface and a network of wire mesh forms the electrically conductive metal layer 4.

We claim:

1. A core formed by a circulating bulk charge of fuel elements for use in a nuclear reactor of the pebble bed type where the separate fuel elements are charged into the core through an inlet, move through the core from the inlet to the outlet and are removed from the core through the outlet, wherein the improvement comprises that the bulk charge of fuel elements comprises a plurality of separate first fuel elements and a plurality of separate second fuel elements with said first and second fuel elements being intermixed and being individually movable through the core, each of said first and second fuel elements having substantially the same exterior shape and size as to be exteriorly indistinguishable, each of said first and second elements comprising a similarly shaped inner body and a rim portion completely enclosing said inner body, said inner body of each of said first and second elements comprising a body of radioactive fuel and moderator material so that said first and second elements behave in the same way with regard to neutron flux, said rim portion of said first and second fuel elements comprising moderator material and being free of radioactive fuel, the outer surface of said rim portion of said first and second fuel elements having the same coefficient of friction, said rim portion of each of said second fuel elements including material marking said second elements with said rim portion of said first fuel elements being free of said material marking said second elements for differentiating said second elements from said first elements as said first and second fuel elements move through the core, said marking material having a greater electrical conductivity than said fuel and moderator material in said first and second elements whereby said second elements are capable of being identified electromagnetically and distinguished thereby from said first elements for measuring the flow rates of said second fuel elements through the core.

2. A core, as set forth in claim 1, wherein said inner body of said first and second fuel elements is solid.

3. A core, as set forth in claim 1, wherein said marking material comprises a continuous layer of highly electrically conductive material applied to the outer surface of the rim portion of said second fuel elements.

4. A core, as set forth in claim 1, wherein said marking material consists of a layer of highly electrically conductive material applied to the outer surface of the rim portion of said second fuel elements with said layer of marking material being discontinuous on the outer surface so that a portion of the outer surface is formed by other than the layer of marking material.

5. A core, as set forth in claim 1, wherein said marking material comprises a continuous layer of highly electrically conductive material situated within said rim portion of said second fuel elements inwardly of the outer surface thereof and affording a complete enclosure of said inner body.

6. A core, as set forth in claim 1, wherein aid marking material comprises a layer of highly electrically conductive material situated in said rim portion of said second fuel elements inwardly of the outer surface thereof with said layer of marking material being discontinuous about said inner body so that said layer does not afford a complete enclosure of said inner body.

7. A core, as set forth in claim 1, wherein said marking material comprises three metal loops lying in mutually perpendicular planes, said loops being electrically bonded to one another at their points of intersection, and said metal loops located inwardly of the outer surface of said rim portion of said second elements and outwardly of the outer surface of said inner body.

8. A core, as set forth in claim 1, wherein said marking material comprises a material selected from a group consisting of silicon, tungsten, tantalum, zirconium, titanium, iridium, osmium or rhenium.

9. A core, as set forth in claim 1, wherein aid marking material comprises a material selected from a group consisting of a carbide of silicon, tungsten, tantalum, zirconium, or titanium.

10. A core, as set forth in claim 1, wherein said marking material has a surface electrical resistance having an average value of about 1.5 milliohm.

11. A core, as set forth in claim 1, wherein said marking material is deposited chemically from the vapor phase.

12. A core, as set forth in claim 1, wherein said marking material is deposited by currentless chemical deposition.

13. A core, as set forth in claim 1, wherein said marking material is deposited electrolytically.

14. A core formed by a circulating bulk charge of fuel element for use in a nuclear reactor of the pebble bed type wherein the improvement comprises that the bulk charge of fuel elements comprises a plurality of first fuel elements and a plurality of second fuel elements, said first and second fuel elements each having substantially the same exterior shape and size as to be exteriorly indistinguishable, each of said first and second fuel elements comprising an inner body and a rim portion enclosing said inner body, said inner body of said first and second elements being solid and comprising a body of radioactive fuel and moderator material, said rim portion of said first and second elements comprising moderator material, the surface of said inner body of each of said second fuel elements having grooves formed therein, a highly electrically conductive material filling said grooves, said rim portion completely enclosing said material filling said grooves, the outer surface of said rim portion of said first and second fuel elements having the same coefficient of friction, said marking material in said second elements differentiating said second elements from said first elements, said marking material having a greater electrical conductivity than said fuel and moderator material in said first and second elements whereby said second elements are capable of being identified electromagnetically and distinguished thereby from said first fuel elements.

15. A core, as set forth in claim 14, wherein said highly conductive material comprises a network of wire mesh formed of a highly electrically conductive metal having a high melting point.

16. A core, as set forth in claim 14, wherein said marking material comprises a material selected from a group consisting of silicon, tungsten, tantalum, zirconium, titanium, iridium, osmium or rhenium.

17. A core, as set forth in claim 14, wherein said marking material comprises a material selected from a group consisting of a carbide of silicon, tungsten, tantalum, zirconium, or titanium.

* * * * *